(12) United States Patent
Rickeby et al.

(10) Patent No.: US 11,173,389 B2
(45) Date of Patent: Nov. 16, 2021

(54) MULTIPATH WIRELESS CONTROLLER

(71) Applicant: Sony Interactive Entertainment LLC, San Mateo, CA (US)

(72) Inventors: Christian Rickeby, San Mateo, CA (US); Torgeir Hagland, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/526,625

(22) Filed: Jul. 30, 2019

(65) Prior Publication Data

US 2021/0031100 A1    Feb. 4, 2021

(51) Int. Cl.
| | |
|---|---|
| A63F 13/235 | (2014.01) |
| H04L 29/06 | (2006.01) |
| H04L 29/08 | (2006.01) |
| H04W 88/06 | (2009.01) |
| A63F 13/358 | (2014.01) |
| A63F 13/31 | (2014.01) |
| A63F 13/33 | (2014.01) |

(52) U.S. Cl.
CPC ............ *A63F 13/235* (2014.09); *H04L 69/18* (2013.01); *H04L 69/324* (2013.01); *H04W 88/06* (2013.01)

(58) Field of Classification Search
CPC ..... A63F 13/235; H04L 69/324; H04L 69/18; H04W 88/06
See application file for complete search history.

(56) References Cited

U.S. PATENT DOCUMENTS

| | | | |
|---|---|---|---|
| 8,282,476 | B2 * | 10/2012 | Walter ............... H04N 21/4781 463/29 |
| 2003/0027633 | A1 * | 2/2003 | Hames ................. A63F 13/235 463/39 |
| 2007/0263710 | A1 | 11/2007 | Kasslin et al. |
| 2012/0275324 | A1 | 11/2012 | Hashimoto et al. |
| 2014/0002753 | A1 | 1/2014 | Griffin |
| 2015/0349926 | A1 | 12/2015 | Pollack et al. |
| 2015/0365986 | A1 | 12/2015 | Lee et al. |
| 2017/0086237 | A1 * | 3/2017 | Ando ..................... H04W 76/11 |
| 2018/0191930 | A1 * | 7/2018 | Jeong .................... H05K 1/144 |
| 2018/0210760 | A1 * | 7/2018 | Wisniewski .......... G06F 9/5033 |
| 2019/0210564 | A1 * | 7/2019 | Han ....................... H04L 67/18 |
| 2019/0272690 | A1 * | 9/2019 | Kaye .................. G07C 9/00571 |
| 2019/0290999 | A1 * | 9/2019 | Bradner ................ A63F 13/211 |
| 2020/0068425 | A1 * | 2/2020 | Xue ..................... H04B 17/309 |

FOREIGN PATENT DOCUMENTS

| | | | |
|---|---|---|---|
| CN | 107623682 A | * | 1/2018 |
| TW | M545943 U | | 7/2017 |

OTHER PUBLICATIONS

Inernational Search Report and Written Opinion dated Sep. 28, 2020 from the counterpart PCT application PCT/US20/40838.

* cited by examiner

*Primary Examiner* — Ajit Patel
*Assistant Examiner* — Harry H. Kim
(74) *Attorney, Agent, or Firm* — John L. Rogitz

(57) ABSTRACT

A computer simulation controller includes both a Bluetooth transceiver and a Wi-Fi transceiver. Player input to the controller generates commands that are sent using both transceivers, such that a receiving apparatus such as a game console or a web server can use the first-arriving one of the two commands to reduce latency.

15 Claims, 5 Drawing Sheets

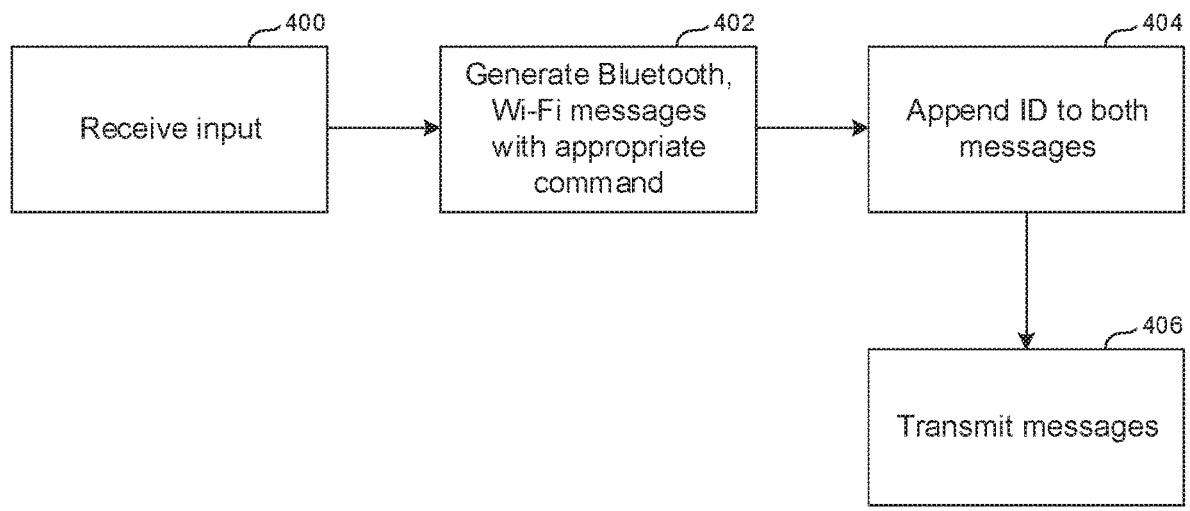
FIG. 4 (controller)
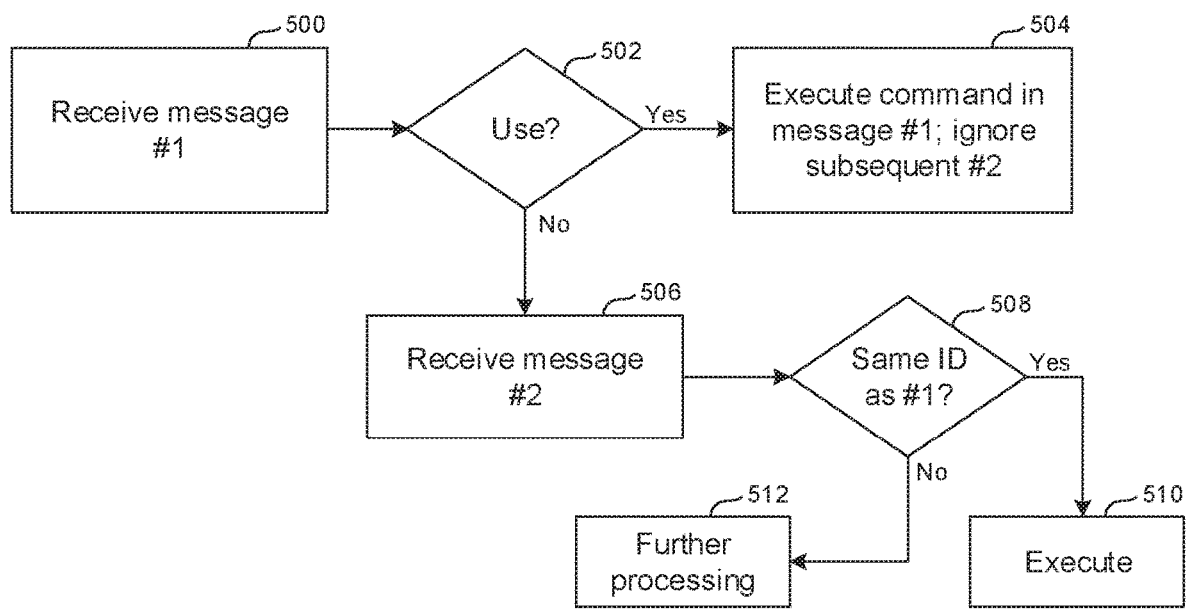
FIG. 5 (receiver)

MULTIPATH WIRELESS CONTROLLER

FIELD

The present application relates to technically inventive, non-routine text-to-speech solutions that are necessarily rooted in computer technology and that produce concrete technical improvements.

BACKGROUND

As recognized herein, with the growing sophistication of computer simulations such as computer games, players have become increasingly demanding of performance, one index of which is latency between gamer input and the resulting action on screen. As also understood herein, particularly in the case of wireless controllers there is little that can be done to address latency issues with a wireless link during play. There are currently no adequate solutions to the foregoing computer-related, technological problem.

SUMMARY

A computer simulation controller includes plural controls, at least one Bluetooth transceiver configured for transmitting wireless signals responsive to operation of at least one of the controls, and at least one transceiver configured for transmitting wireless signals responsive to operation of at least one of the controls.

In example embodiments, the controller may include at least one universal serial bus (USB) interface.

In implementations, the computer simulation controller includes at least one processor configured with instructions to receive first input from operation of a first one of the controls, and responsive to the first input, generate first data. The processor is configured to send the first data in a Bluetooth message using the Bluetooth transceiver and also to send the first data in a Wi-Fi message using the Wi-Fi transceiver. In these implementations the instructions can be executable to send the first data simultaneously on both the Bluetooth transceiver and the Wi-Fi transceiver. The instructions may be executable to append an identification (ID) to the Bluetooth message and append an ID to the Wi-Fi message. The IDs indicate that a command in the Bluetooth message and a command in the Wi-Fi message are identical to each other. The ID may include a packet ID.

In another aspect, a system includes at least one receiver configured to execute a computer simulation for presentation thereof on a display. The receiver includes at least one computer memory that is not a transitory signal and that comprises instructions executable by at least one processor to receive a first command from a controller over a first path at least in part established by a first wireless link. The instructions are executable to receive a second command from the controller over a second path at least in part established by a second wireless link different from the first wireless link. Further, the instructions are executable to execute at least one of the commands and not execute the other one of the commands based at least in part on determining, using respective identifications (ID) appended to each command, that the first command and second command are identical to each other.

In this aspect, if desired the receiver includes a computer simulation console local to the controller. The receiver may include at least one server remote from the controller and configured for communicating therewith over a wide area network.

In example implementations, the instructions may be executable to execute the first command prior to receiving the second command and not execute the second command responsive to receiving the second command after the first command. In some embodiments the instructions can be executable to execute the second command prior to receiving the first command and not execute the first command responsive to receiving the first command after the second command. In examples, the first and second commands are for a first packet, and the instructions may be executable to receive a third command from the controller over the first path, and receive a fourth command from the controller over the second path, with the third and fourth commands being for a second packet. The instructions may be executable to execute the first command prior to receiving the second command and not execute the second command responsive to receiving the second command after the first command, while executing the fourth command prior to receiving the third command and not executing the third command responsive to receiving the third command after the fourth command. In other words, Bluetooth may be used for executing some commands and Wi-Fi may be used for other commands.

In some embodiments the first and second commands are received in respective first and second signals. The first signal can be received before the second signal and the instructions nonetheless may be executable to determine at least one quality index of the first signal. Responsive to the quality index being a first index, the first command is not executed, but responsive to the quality index being a second (better) index, the first command is executed prior to receiving the second signal.

In another aspect, a system includes at least one computer simulation controller configured to, responsive to a single manipulation of a control, wirelessly transmit first signal at a first frequency and a second signal at a second frequency, with each signal containing a respective command. The command carried in the first signal is identical to the command carried in the second signal. At least one simulation console is configured to execute a computer simulation for presentation thereof on at least one display under control of the simulation controller responsive to the command carried in the first signal and not execute the command carried in the second signal.

The details of the present application, both as to its structure and operation, can best be understood in reference to the accompanying drawings, in which like reference numerals refer to like parts, and in which:

BRIEF DESCRIPTION OF THE DRAWINGS

FIG. 4 is a flow chart of example logic that may be executed by the controller, FIG. 5 is a flow chart of example logic that may be executed by the receiver (either a console or a cloud server);

DETAILED DESCRIPTION

A computer simulation controller with at least two transceivers, such as both a Bluetooth transceiver and a Wi-Fi transceiver, simultaneously sends both Bluetooth and Wi-Fi signals responsive to manipulation of a key or button on the controller. In other words, when a button is pressed on the controller to generate a command, also referred to herein as an "event", the event is sent on all wireless channels. The receiver receives on all paths and uses the quickest earliesarriving) packet. The event signals contain respective identifiers that indicate to the receiver that both signals carry the same information, e.g., that both signals have the same packet number. This guarantees the lowers possible latency and increases reliability.

If desired, the controller negotiates the shortest path to the controlled console, whether it is local or remote. For example, for streaming from a remote console, the network identification of the console may be obtained (e.g., via the local console Bluetooth link or other component, or using a phone to scan a bar code presented on the simulation that indicates the address of the source console, or other means) and provided to the controller for addressing Wi-Fi commands direct to the remote console without passing through, in sequence, the local console, a remote server, and thence to the remote console.

Note that the controller may employ more than two transceivers. For example, the con roller may employ two or more of any combination of the following non-limiting examples: Bluetooth, Bluetooth low energy, Wi-Fi 2.4 GHz, Wi-Fi 5 GHz, universal serial bus (USB).

Figure 1:
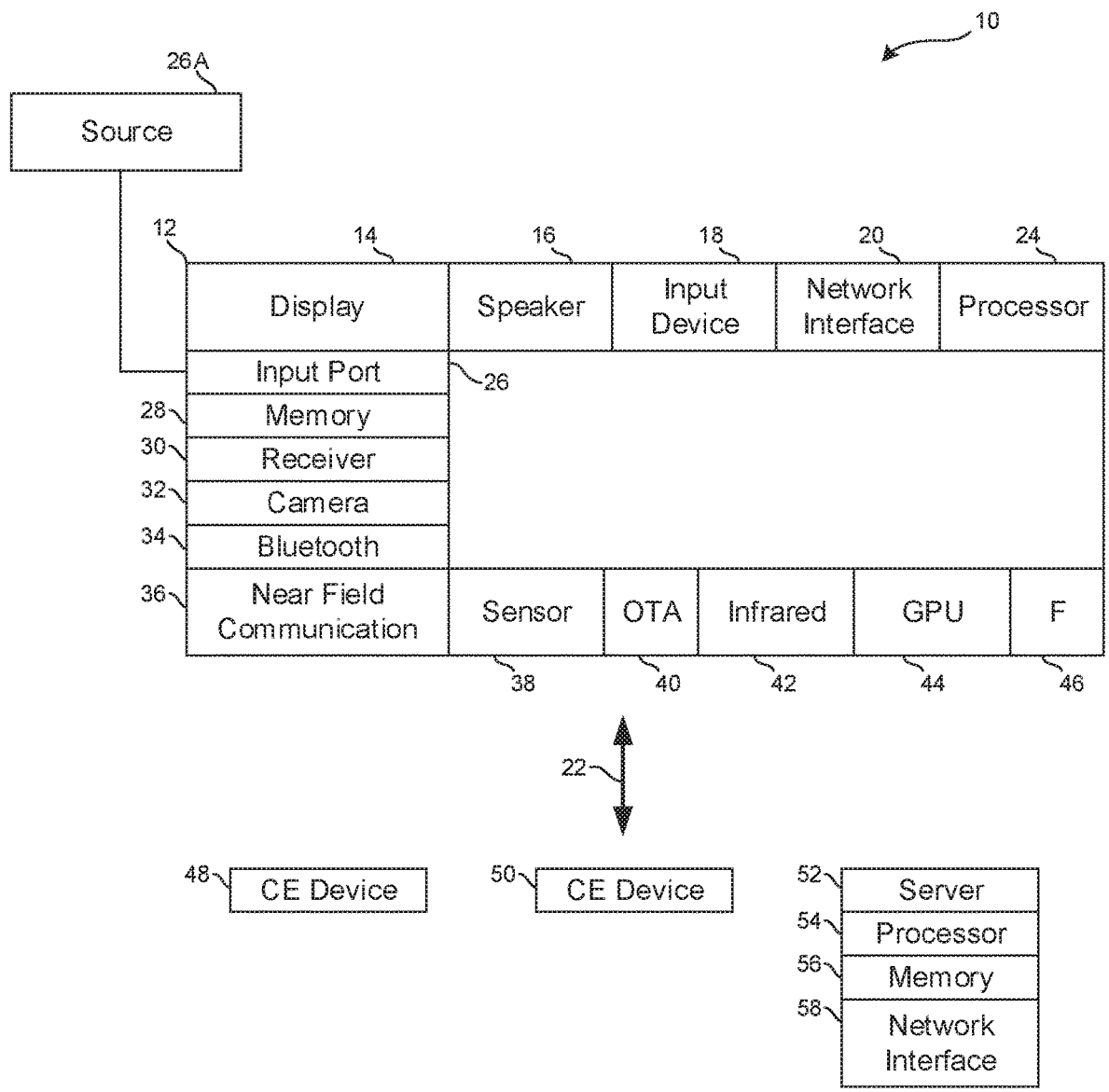
FIG. 1 is a block diagram of an example system consistent with present principles.

Now referring to FIG. 1, this disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. Note that computerized devices described in all of the figures herein may include some or all of the components set forth for various devices in FIG. 1.

The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized. Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. The AVDD 12 may also include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may further include one or more network interfaces 20 for communication over at least one network 22 such as the Internet, an WAN an LAN, a PAN etc. under control of one or more processors 24. Thus, the interface 20 may be, without limitation, a transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player.

The AVDD 12 may further include one or more computer memories 28 such as disk-based or solid-state storage that are not transitory signals, in some cases embodied in the chassis of the AVDD as standalone devices or as a personal video recording device (PVR) or video disk player either internal or external to the chassis of the AVDD for playing back AV programs or as removable memory media. Also, in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 38 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc.) providing input to the processor 24. The AVDD 12 may include an over-the-air TV broadcast port 40 for receiving OTA TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still further, in some embodiments the AVDD 12 may include a graphics processing unit (GPU) 44 and/or a field-programmable gate array (FPGA) 46. The GPU and/or FPGA may be utilized by the AVDD 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the AVDD 12, the system 10 may include one or more other computer device types that may include some or all of the components shown for the AVDD 12. In one example, a first device 48 and a second device 50 are shown and may include similar components as some or all of the components of the AVDD 12. Fewer or greater devices may be used than shown.

The system 10 also may include one or more servers 52. A server 52 may include at least one server processor 54, at least one computer memory 56 such as disk-based or solid state storage, and at least one network interface 58 that, under control of the server processor 54, allows for communication with the other devices of FIG. 1 over the network 22, and indeed may facilitate communication between servers, controllers, and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server and may include and perform "cloud" functions such that the devices of the system 10 may access a "cloud" environment via the server 52 in example embodiments. Or, the server 52 may be implemented by a game console or other computer in the same room as the other devices shown in FIG. 1 or nearby.

The devices described below may incorporate some or all of the elements described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 2:
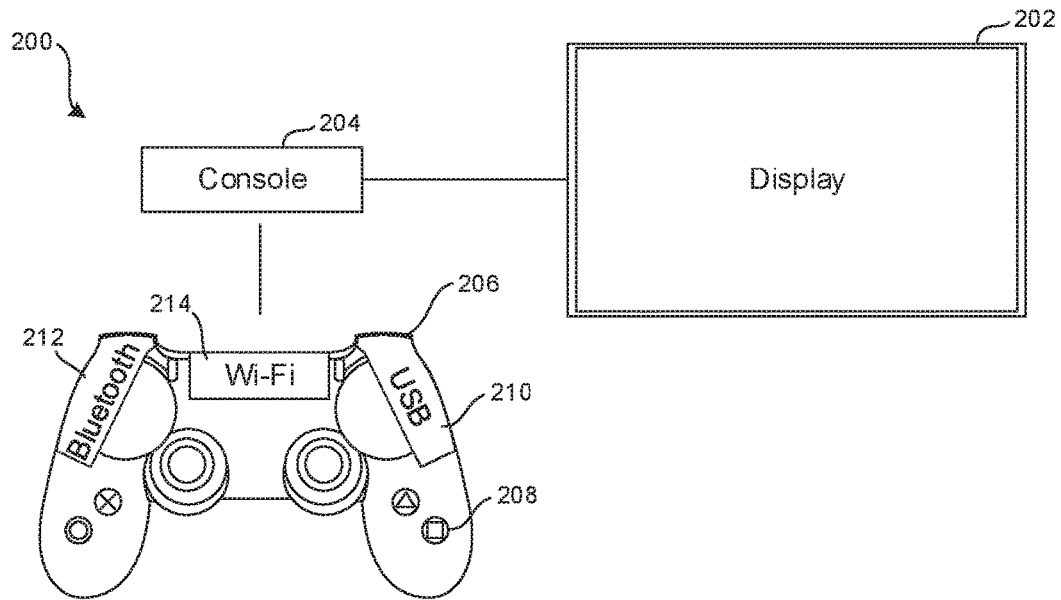
FIG. 2 is a schematic diagram of a first computer simulation architecture consistent with present principles.

FIG. 2 illustrates a computer simulation system 200 that includes a display 202 such as a TV display communicating with a computer simulation console 204 such as a PlayStation® or Xbox® or other game console. A simulation controller 206 with control keys or buttons 208 may be manipulated by a player to send command signals to the controller 204 for altering presentation of a computer simulation on the display 202 in response thereto.

In the example shown, the controller 206 may include, if desired, a universal serial bus (USB) interface 210. The controller 206 also includes at least one Bluetooth wireless transceiver 212 and at least one Wi-Fi wireless transceiver 214. As mentioned above, two or more than two wireless transceivers may be provided using any combinations of Bluetooth, Bluetooth low energy, Wi-Fi 2.4 GHz, Wi-Fi 5 GHz, universal serial bus (USB) as non-limiting examples.

Figure 3:
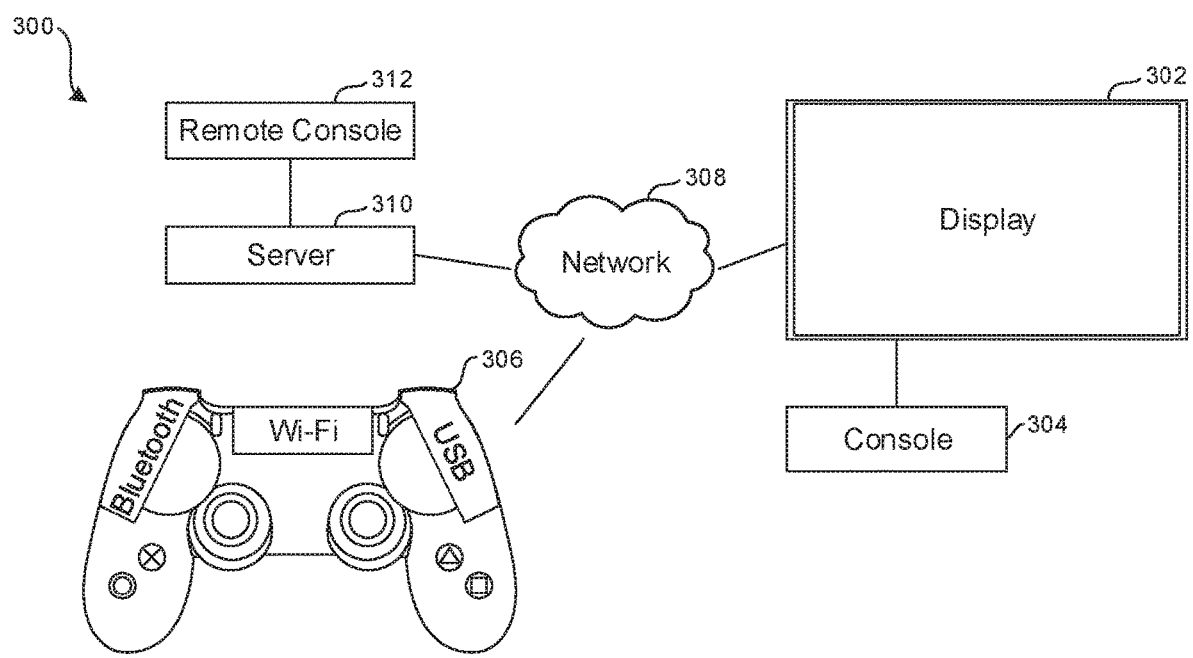
FIG. 3 is a schematic diagram of a second computer simulation architecture consistent with present principles.

FIG. 3 illustrates a networked simulation system 300 with display 302, local console 304, and controller 306 that in all essential respects may be identical in operation and configuration to the display 202, console 204, and controller 306 shown in FIG. 2 and described above. However, in FIG. 3 the controller 306 and/or display 302 and/or console 304 may communicate with a network 308 such as the Internet through which communication to one or more servers 310 may be established. The server 310 shown in FIG. 3 may access a remote simulation console 312 to provide streaming computer games and other simulations for play on the display 302 responsive to commands generated by a player manipulating the controller 306.

Refer now to FIG. 4 for an understanding of example logic that may be executed by one or more processors (such as any of the processors described herein and shown, e.g., in FIG. 1) in the controller 206 or 306. Commencing at block 400, the processor receives input generated by player manipulation of the controller keys or buttons. The input represents commands. Proceeding to block 402, the processor generates both a Bluetooth message and a Wi-Fi message each containing the identical command generated by the input at block 400. These messages carry duplicate information as each other and may be referred to herein from time to time as paired messages. Note that each message may contain information pertaining the most recent button manipulation on the controller and may if desired contain information pertaining to the last X button manipulations, where X is an integer, to ensure that if one command is lost in both bands, it may be recovered with the next transmission.

Moving to block 404, to each message, an identification (ID) may be appended, such as a packet number or other ID. The ID appended to the Bluetooth message and the ID appended to the Wi-Fi message indicate that both messages carry the same information pertaining to a command or commands to be executed as each other, so that a receiver receiving both messages can ascertain, using the IDs, that the messages carry duplicate command information. The paired messages are transmitted, preferably simultaneously or as soon as each message is ready to transmit, at block 406. In other words, while conceptually the messages are transmitted simultaneously, some time difference may exist between actual transmission owing to, for instance, differing latencies in message processing and generation between Bluetooth and Wi-Fi.

FIG. 5 illustrates logic that may be executed by one or more processors, (such as any of the processors described herein and shown, e.g., in FIG. 1) in a receiver, such as the consoles 204, 304, server 310, or other receiver of commands from the controllers 206, 306. Commencing at block 500, at least one of the two paired messages, referred to in FIG. 5 as "message #1", is received. In example implementations the logic may include a decision at diamond 502 whether to use the message received at block 500 based on, for example, the quality of the message. Quality may be indicated by, for instance, signal strength, bit error rate (BER), signal to noise ratio (SNR), or other quality metric.

In the event that the message received at block 500 is determined to be of sufficient quality for the receiver to be able to extract and understand the command in the message, or in embodiments in which diamond 502 is omitted, the logic flows to block 504 to execute the command in the message #1. Any subsequent reception of the second of the paired messages is then ignored based on identifying the second of the paired messages as containing duplicate information to that contained in the first of the (executed) paired messages on the basis of comparing the ID of the second (later-received) message with the ID of the first-received message and determining that the IDs indicate that the paired messages contain the same information.

On the other hand, if at decision diamond 502 the first-received of the paired messages is determined to be of insufficient quality to be able to use, the logic moves to block 506 to receive the second arriving of the paired messages. From block 506 the logic may proceed to decision diamond 508 to determine, based on the message IDs, whether the second-arriving message contains the same information as the first-received message at block 500. If so, the command contained in the second message is executed at block 510.

In contrast, if it is determined based on the message IDs that the second-arriving message received at block 506 does not contain the same information as the first-received message at block 500, the logic may move to block 512 for further processing. This recognizes that the second message received at block 506 was not the duplicate of the first message received at block 500 and that further action is required. For example, the second message may be used to execute a different command and the first message may be retrieved and processed as best able to attempt to read the command in the first message for execution.

In the event that the paired messages are received exactly simultaneously, it is to be understood that one of the messages may be selected for execution using an appropriate default rule. For example, the Bluetooth message may always be selected as a default in such a circumstance over the Wi-Fi message, or vice-versa. Or, the message with the highest signal strength or lowest BER or highest SNR may be selected.

Figure 6:
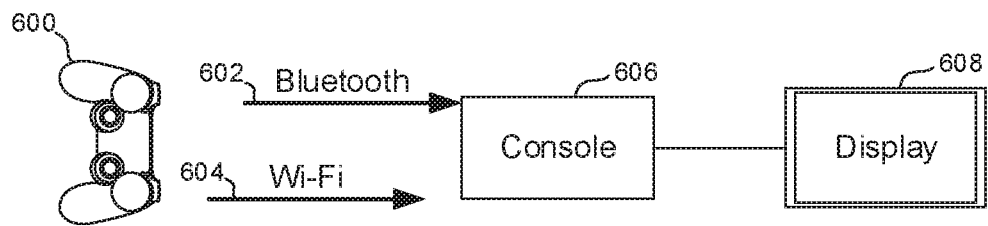
FIG. 6 schematically illustrates a first use example.

FIGS. 6-9 illustrate various situations addressed by the logic above. In FIG. 6, in a home architecture such as shown in FIG. 2 and described above a controller 600 transmits a wireless Bluetooth signal 602 and a wireless Wi-Fi signal 604 to a local console 606 pursuant to receiving user input, for altering presentation of a computer simulation on a display 608, Each signal contains the same command as the other signal. As indicated by the staggering of the arrows in FIG. 1, the Bluetooth connection is faster than the Wi-Fi connection. In this case the Bluetooth message would be used because it is delivered before the Wi-Fi copy of the message.

Figure 7:
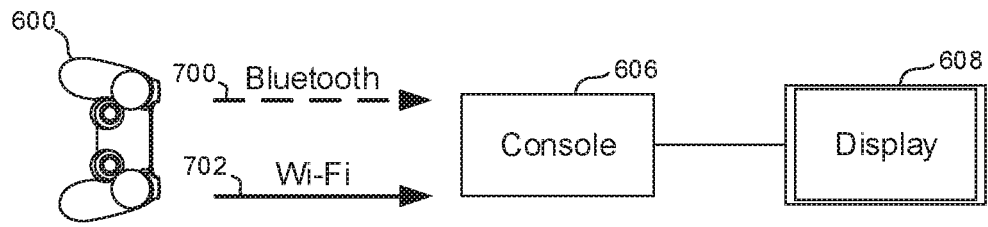
FIG. 7 schematically illustrates a second use example.

FIG. 7 illustrates a second example in home with the user again playing on his local console in a home architecture such as shown in FIG. 2 and described above. As indicated by the dashed line 700 representing the Bluetooth message of the pair, the Bluetooth signal is weak, implying that the Bluetooth connection is unreliable, but as indicated by the solid line 702 representing the Wi-Fi message of the pair, the Wi-Fi connection is strong and stable. In this case the message is used since the Bluetooth message may be lost and/or delivered slower (although in the specific example shown both messages 700, 702 may arrive at the console 606 at the same time).

Figure 8A:
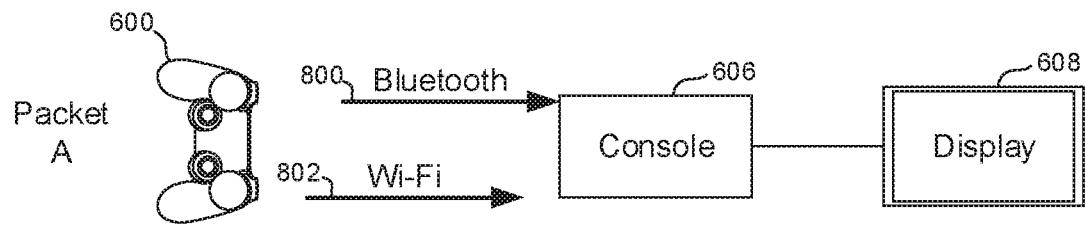
FIGS. 8A and 8B schematically illustrate a third use example.
Figure 8B:
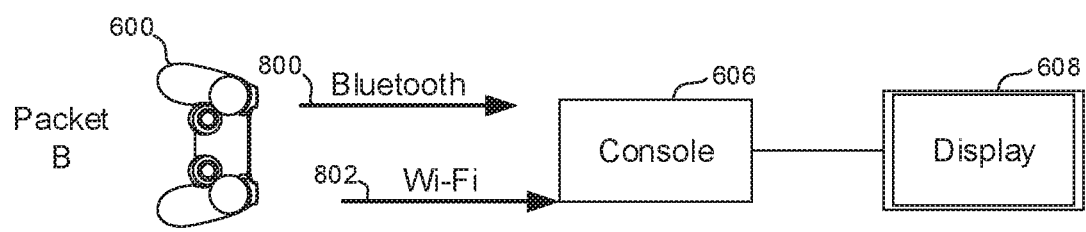

FIGS. 8A and 8B illustrate a third example, again in a home architecture such as shown in FIG. 2 and described above, in which for a first packet (FIG. 8A) both the Bluetooth signal 800 and the Wi-Fi signal 802 are strong and stable, and the same is true for a second packet represented in FIG. 8B. The message whose command is executed is from the path that delivers the message fastest (Bluetooth in FIG. 8A for the first packet, Wi-Fi in FIG. 8B for a second packet). If there is temporary congestion on the link, the Bluetooth message might be used more often and vice versa.

Thus, in a home implementation with the user playing on his local console, the user could have a strong Bluetooth connection and the Wi-Fi connection may also be strong and stable, in which case the messages whose commands are executed are from the path that delivered the message fastest. If there is temporary congestion on the Bluetooth connection or the limited Bluetooth bandwidth is being shared by multiple controllers with connected microphones, the Wi-Fi messages likely would arrive quicker and thus would be used.

Figure 9:
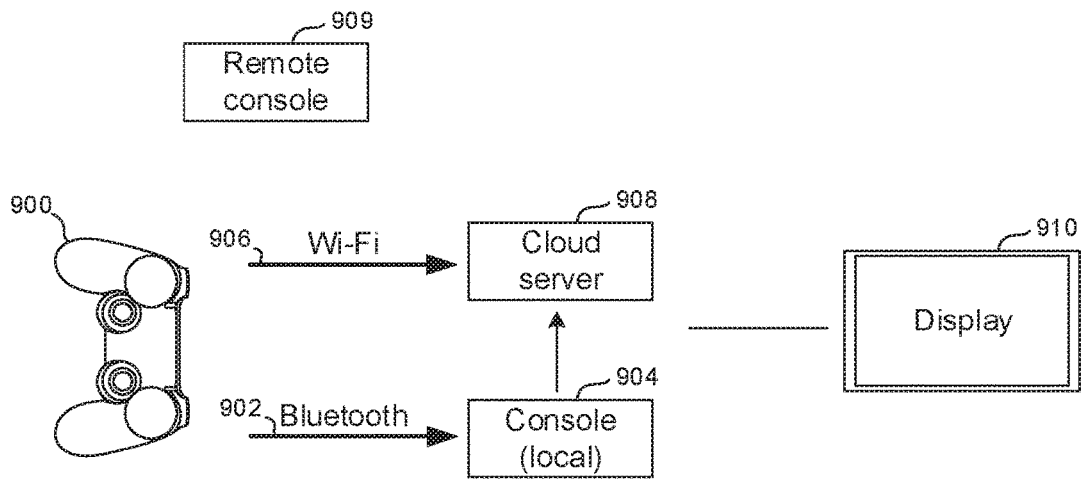
FIG. 9 schematically illustrates a fourth use example.

FIG. 9 illustrates a networked embodiment such as illustrated in FIG. 3 and described above. A controller 900 may communicate Bluetooth commands 902 to a local console 904 and may also communicate identical Wi-Fi commands 906 over a network to one or more cloud servers 908 accessing one or more remote simulation consoles 909 for control of a computer simulation on a display 910. If the direct Wi-Fi connection 906 to the server 908 is faster than the combined Bluetooth connection 902 to the local console 904 and thence to the server 908 with remote console, which is assumed to be executing the simulation being presented on the display 910, the receiving server will execute the command in the Wi-Fi signal on the basis of the signal being received prior to the duplicate command embodied in the Bluetooth signal.

Figure 10:
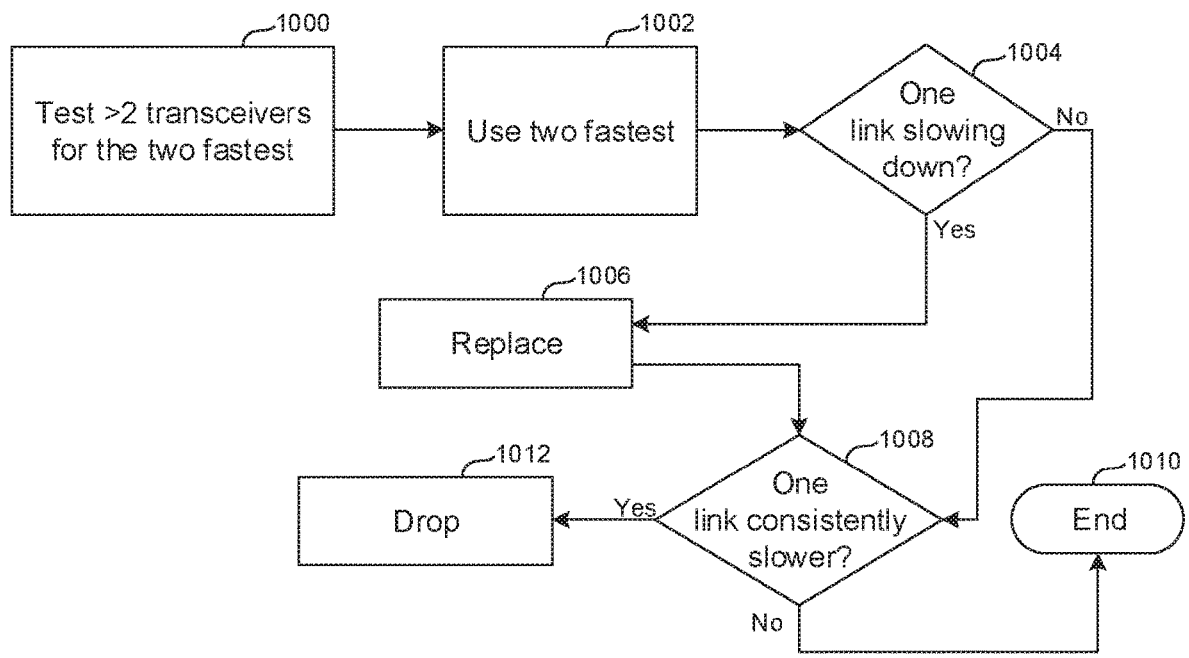
FIG. 10 is a flow chart of example additional logic consistent with present principles.

FIG. 10 illustrates additional logic that may be optionally employed. Commencing at block 1000, at the start of simulation play the system may test more than two wireless transceivers for latency. This may be done by causing the controller to send test packets through three or more transceivers to, e.g., a remote console. The test packets can indicate which transceiver sent them. The remote console can then indicate which test packets arrived before the others and, hence, identify which two of three or more transceivers should be used at block 1002 for the current simulation under the existing conditions.

Decision diamond 1004 indicates that during simulation play, it may be determined whether one of the two links associated with the transceivers selected at block 1002 is slowing down, as indicated by latency. If one of the two is slowing down, it may be replaced with a third transceiver at block 1006 and taken out of service, with the surviving transceiver and new transceiver then being used as described above to deliver duplicate command signals from the controller.

Decision diamond 1008 indicates that during simulation play, it may be determined whether one of the two links associated with the transceivers selected at block 1002 is consistently slower than the other link. This operation may be particularly useful when the controller has only two transceivers and/or when battery voltage of the controller is below a threshold. Latency determinations may be made in this regard, e.g., the receiver of the packets may report to the controller that packets from one of the two transceivers arrive after their counterpart packets from the other transceiver for more than a threshold. For instance, 95 out of 100 packets from one transceiver arrive after their counterpart packets from the other transceiver, the test at decision diamond 1008 may return positive, in which case the slow transceiver is dropped at block 1012 from sending commands, and only one transceiver is thereafter used to send commands.

It will be appreciated that whilst present principals have been described with reference to some example embodiments, these are not intended to be limiting, and that various alternative arrangements may be used to implement the subject matter claimed herein.

What is claimed is:

1. A system comprising:
   at least one receiver configured to execute a computer simulation for presentation thereof on a display, the receiver comprising:
   at least one processor configured with instructions to:
   receive a first command from a controller over a first path at least in part established by a first wireless link;
   receive a second command from the controller over a second path at least in part established by a second wireless link different from the first wireless link;
   execute at least one of the commands and not duplicatively execute the other one of the commands based at least in part on determining, using respective identifications (ID) appended to each command, that the first command and second command are identical to each other, wherein the first and second commands are for a first packet, and the instructions are executable to:
   receive a third command from the controller over the first path;
   receive a fourth command from the controller over the second path, the third and fourth commands being for a second packet;
   execute the first command prior to receiving the second command and not execute the second command responsive to receiving the second command after the first command; and execute the fourth command prior to receiving the third command and not execute the third command responsive to receiving the third command after the fourth command.

2. The system of claim 1, wherein the receiver comprises a computer simulation console local to the controller.

3. The system of claim 1, wherein the receiver comprises at least one server remote from the controller and configured for communicating therewith over a wide area network.

4. The system of claim 1, wherein the instructions are executable to:
execute the first command prior to receiving the second command and not execute the second command responsive to receiving the second command after the first command.

5. The system of claim 1, wherein the instructions are executable to:
execute the second command prior to receiving the first command and not execute the first command responsive to receiving the first command after the second command.

6. The system of claim 1, comprising the controller.

7. The system of claim 6, wherein the controller comprises:
plural controls;
at least one Bluetooth transceiver configured for transmitting wireless signals responsive to operation of at least one of the controls; and
at least one Wi-Fi transceiver configured for transmitting wireless signals responsive to operation of at least one of the controls.

8. The system of claim 1, wherein the first path comprises a simulation console local to the controller.

9. A system comprising:
at least one receiver configured to execute a computer simulation for presentation thereof on a display, the receiver comprising:
at least one processor configured with instructions to:
receive a first command from a controller over a first path at least in part established by a first wireless link;
receive a second command from the controller over a second path at least in part established by a second wireless link different from the first wireless link;
execute at least one of the commands and not execute the other one of the commands based at least in part on determining, using respective identifications (ID) appended to each command, that the first command and second command are identical to each other,
wherein the first and second commands are received in respective first and second signals, the first signal is received before the second signal, and the instructions are executable to:
determine at least one quality index of the first signal;
responsive to the quality index comprising a first index, not execute the first command; and
responsive to the quality index comprising a second index, execute the first command prior to receiving the second signal.

10. The system of claim 9, wherein the receiver comprises a computer simulation console local to the controller.

11. The system of claim 9, wherein the receiver comprises at least one server remote from the controller and configured for communicating therewith over a wide area network.

12. The system of claim 9, wherein the instructions are executable to:
execute the first command prior to receiving the second command and not execute the second command responsive to receiving the second command after the first command.

13. The system of claim 9, wherein the instructions are executable to:
execute the second command prior to receiving the first command and not execute the first command responsive to receiving the first command after the second command.

14. The system of claim 9, comprising the controller.

15. The system of claim 14, wherein the controller comprises:
plural controls;
at least one Bluetooth transceiver configured for transmitting wireless signals responsive to operation of at least one of the controls; and
at least one Wi-Fi transceiver configured for transmitting wireless signals responsive to operation of at least one of the controls.

* * * * *